United States Patent [19]

Ishiwata

[11] Patent Number: 4,481,598

[45] Date of Patent: Nov. 6, 1984

[54] ELECTRONIC EQUIPMENT HAVING A SECOND FUNCTION KEYING SYSTEM

[75] Inventor: Junichi Ishiwata, Yokohama, Japan

[73] Assignee: Canon Kabushiki Kaisha, Tokyo, Japan

[21] Appl. No.: 353,187

[22] Filed: Mar. 1, 1982

[30] Foreign Application Priority Data

Mar. 9, 1981 [JP] Japan .................. 56-32429

[51] Int. Cl.³ .............................................. G06F 3/14
[52] U.S. Cl. ...................................... 364/710; 364/709
[58] Field of Search ...................... 364/709, 710, 715

[56] References Cited

U.S. PATENT DOCUMENTS

| | | | |
|---|---|---|---|
| 3,892,958 | 7/1975 | Tung | 364/709 |
| 3,973,113 | 8/1976 | Goldsamt | 364/709 |
| 4,001,569 | 1/1977 | Dickinson et al. | 364/715 |
| 4,044,242 | 8/1977 | Laesser | 364/709 |
| 4,078,257 | 3/1978 | Bagley | 364/709 X |
| 4,202,038 | 5/1980 | Petersson | 364/709 |
| 4,228,516 | 10/1980 | Johnston | 364/710 X |
| 4,280,121 | 7/1981 | Crask | 364/709 X |
| 4,386,412 | 5/1983 | Ito | 364/710 |

OTHER PUBLICATIONS

Bigbie, et al., "Programmable Key/Display/Switch Device," *IBM Tech. Disclosure Bulletin*, vol. 21, No. 2, Jul. 1978, pp. 442–444.

*Primary Examiner*—David H. Malzahn
*Attorney, Agent, or Firm*—Fitzpatrick, Cella, Harper & Scinto

[57] ABSTRACT

An electric equipment such as a desk-top calculator having a unit conversion function is disclosed. In addition to a main-display for displaying input numeric data and results of operations, a sub-display is provided on a keyboard to display functions assigned to keys in a second function mode and then display a selected one of the functions. By watching the sub-display, an operator can identify the function for which a unit conversion operation was carried out.

9 Claims, 8 Drawing Figures

ELECTRONIC EQUIPMENT HAVING A SECOND FUNCTION KEYING SYSTEM

BACKGROUND OF THE INVENTION

1. Field of the Invention

The present invention relates to electronic equipment such as an electronic desk-top calculator with a unit conversion function for converting length, weight, or the like between different unit systems and to a desk-top function calculator capable of calculating a trigonometric function and others. More particularly the invention relates to an improvement in a so-called second function key system electronic equipment in which each key is provided with a plurality of arithmetic functions in addition to its primary function and a desired one of the plurality of arithmetic functions is designated by a designation key such as a conversion designation key or a function designation key.

2. Description of the Prior Art

FIG. 1 shows an example of a conventional electronic equipment, that is, a conventional unit conversion desk-top calculator with a second function key system having a unit conversion function for converting units between the English system and the metric system. Numeral 1 denotes a desk-top calculator body having a keyboard 2, including a group of numeric keys 21, and a display 3. On the keyboard 2, two unit indications between which conversion is to be made are marked, by printing or the like with arrows of opposite directions inserted therebetween, above each of the numeric keys [1]-[9] which have a second function. Numerals 4 and 5 denote unit conversion designation keys. By depressing one key 4 or 5, the desk-top calculator 1 is set to a mode (the second function mode) to carry out the unit conversion operation assigned to the depressed one of the numeric keys [1]-[9]. When the unit conversion designation key 4 is depressed, the unit conversion operation from the lefthand unit to the righthand unit indicated above the corresponding numeric keys [1]-[9] is enabled, and when the unit conversion key 5 is depressed, the reverse conversion operation, that is, from the righthand unit to the lefthand unit is enabled.

When units of numerals displayed on the display 3 are to be converted, one unit conversion designation key 4 or 5 is first depressed. Thus, the mode of the desk-top calculator 1 is switched from a normal calculation mode in which numerals are entered by the depression of the numeric keys [1]-[9] to the second function mode in which the unit conversion functions assigned to the respective numeric keys [1]-[9] are carried out. Subsequently, when one of the numeric keys [1]-[9] to which a desired unit conversion function is assigned is depressed, the unit conversion operation of the numerals displayed on the display 3 is carried out and a converted result is then displayed on the display 3.

However, in the prior art second function key system desk-top calculator of the type described above, the indication of the numeric information displayed on the display 3 is the same whether the desk-top calculator is in the normal calculation mode or in the second function mode in which the unit conversion operation is carried out. Accordingly, it is not possible to rapidly determine the mode in which the desk-top calculator is set. Further, in the second function mode, since the display of numeric information by the display 3 before the unit conversion is same as that of the numeric information displayed after the unit conversion, it is not possible to determine whether the numerals so displayed are the unconverted ones or the converted ones. This is inconvenient particularly when operation of the calculator is interrupted. Furthermore, if an operator improperly operates the unit conversion designation key, for example, if the operator depresses the key [8] instead of the key [7] to convert the inch unit (in) to the centimeter unit (cm), the conversion operation from the feed unit (ft) to the meter unit (m) is carried out. Since the operator cannot know what unit conversion operation has been carried out from the resulting numeric information displayed on the display 3, the operator may not notice that an improper operation has been carried out and may use the erroneous numeric information.

SUMMARY OF THE INVENTION

It is an object of the present invention to provide a second function key system desk-top calculator capable of identifying a currently selected mode.

It is another object of the present invention to provide an electronic desk-top calculator which is provided with a sub-display on a keyboard in addition to a convertional display for displaying entered numeric data and the results of operations so that functions of the keys are displayed on the sub-display when the calculator is in the second function mode and a selected one of the functions is also displayed on the sub-display.

DETAILED DESCRIPTION OF THE PREFERRED EMBODIMENTS

Figure 2:
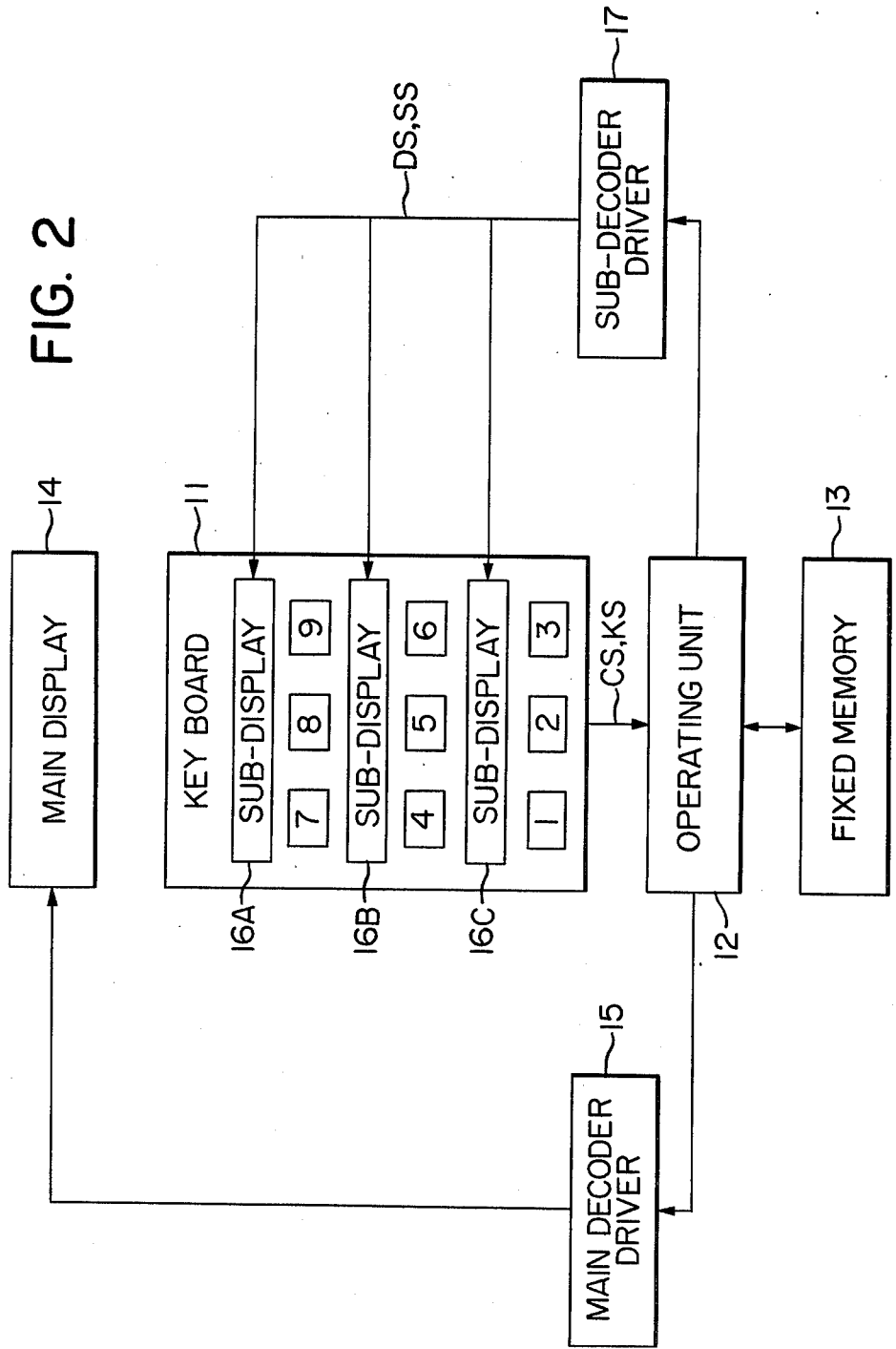
FIG. 2 shows a block diagram of a control unit of an electronic desk-top calculator in accordance with one embodiment of an electronic equipment of the present invention.

FIG. 2 shows a configuration of a desk-top calculator in accordance with one embodiment of the electronic equipment of the present invention. Numeral 11 denotes a keyboard, numeral 12 denotes an arithmetic or operating circuit or unit and numeral 13 denotes a fixed memory. The arithmetic circuit 12 processes input information entered from the keyboard 11 in accordance with processing procedures stored in the fixed memory 13. Numeral 14 denotes a main-display. Numeric information including the numeric data entered from the keyboard 11 and a result of operations from the arithmetic circuit 12 are decoded by a main decoder driver 15 and displayed on the main-display 14. Numerals 16A–16C denote sub-displays arranged on the keyboard 11. As will be explained later, information such as an operation function carried out in the second function mode is decoded by a sub-decoder driver 17 and displayed on the sub-displays 16A–16C.

The operation of the desk-top calculator of the present invention thus configured is now explained with reference to an example shown in FIG. 3.

Figure 1:
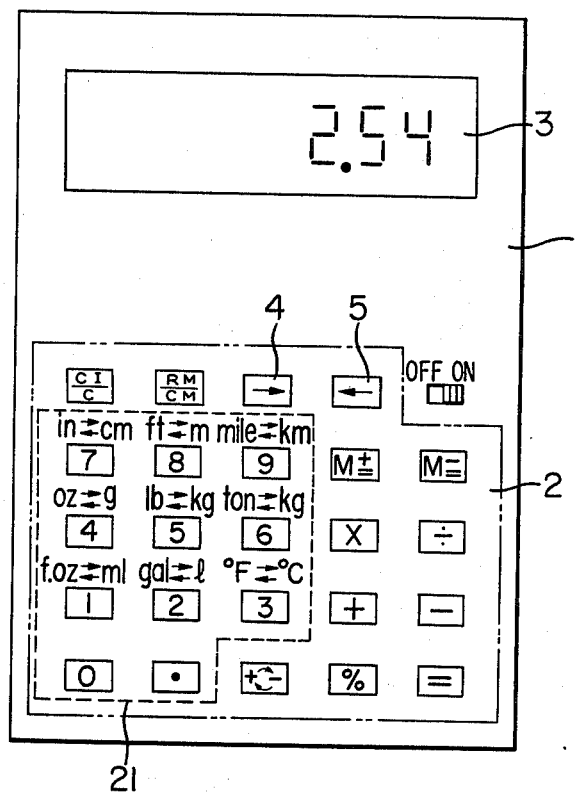
FIG. 1 shows a plan view of a prior art desk-top calculator with a unit conversion function.
Figure 3:
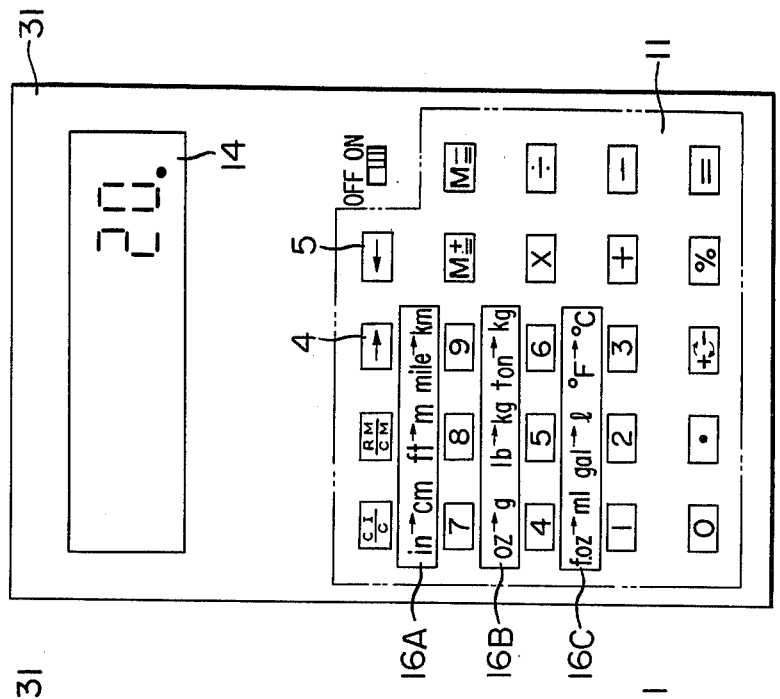
FIG. 3 shows a plan view of the electronic desk-top calculator in accordance with one embodiment of the electronic equipment of the present invention.

FIG. 3 shows an external view of the desk-top calculator of the present invention having the unit conversion function like the example shown in FIG. 1. Numeral 31 denotes a desk-top calculator body which has the keyboard 11 and the main-display 14 shown in FIG. 2. On the keyboard 11, numeric keys [1]-[9] serving as the second function keys are arranged, and the sub-displays 16A-16C are arranged above the numeric keys [1]-[3], [4]-[6] and [7]-[9], respectively. Numerals 4 and 5 denote unit conversion designation keys. When one of them is depressed, the desk-top calculator 31 is set to the second function mode.

When the desk-top calculator 31 is in the normal calculation mode and numeric information "20" is entered from the keyboard 11 to the main-display 14, the conversion functions are displayed on the sub-displays 16A-16C as shown and the numeric information "20" is displayed on the main-display 14.

Figure 4:
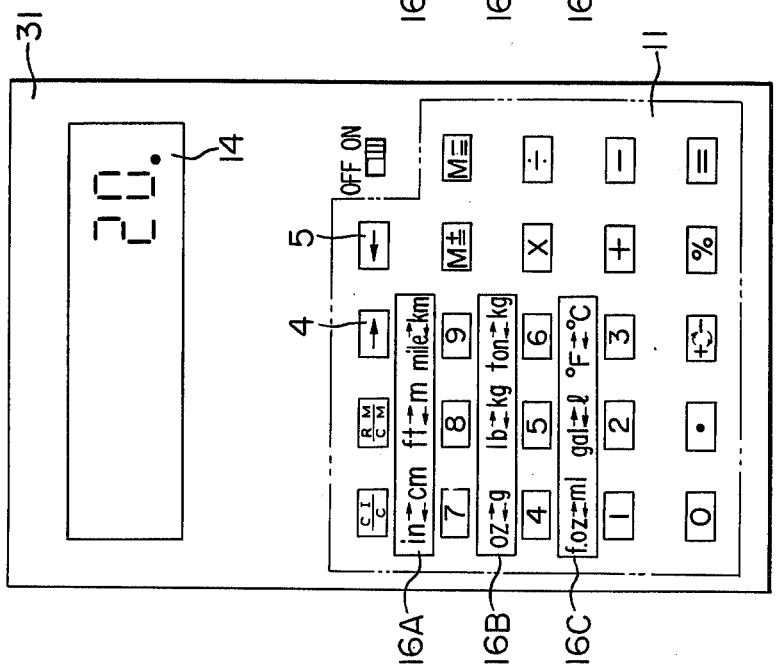
FIGS. 4 to 7 shown plan views illustrating operating states of the electronic desk-top calculator.

Now, if an operator wants the numeric information "20" displayed in the inch unit to be converted to numeric information in the centimeter unit and depresses the unit conversion designation key 4 which designates the rightward unit conversion as in the case shown in FIG. 1, a unit conversion designation signal CS produced by the depression of the unit conversion designation key 4 is sent to the arithmetic circuit 12. The arithmetic circuit 12 is set to the second function mode by the unit conversion designation signal CS and it supplies a second function mode signal DS to the sub-displays 16A-16C through the sub-decoder driver 17. When the second function mode signal DS is applied to the sub-displays 16A-16C, the arrow opposite to the direction of conversion disappears as shown in FIG. 4. The numerals "20" displayed on the main-display 14 remain displayed. Thus, the direction of the arrow indicates the direction of the unit conversion enabled in the current second function mode in the conversion unit displayed on the sub-displays 16A-16C. In the present example, since the arrow is directed to the right, it is seen that the unit conversion from the English system to the metric system is enabled, by the indication "in→cm" displayed on the sub-display 16A above the numeric key 7.

Figure 5:
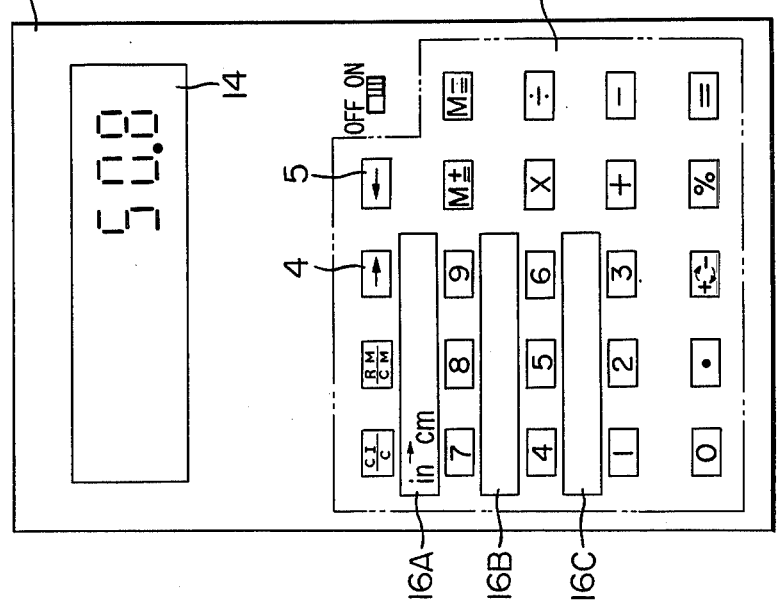

When the key [7] is depressed while the conversion unit is displayed on the sub-displays 16A-16C, a key signal KS produced by the depression of the key [7] is supplied from the keyboard 11 to the arithmetic circuit 12. Since the arithmetic circuit 12 is in the second function mode as described above, the conversion operation from the inch unit (in) to the centimeter unit (cm) is carried out in response to the key signal KS. That is, the numeric information "20" displayed on the main-display 14 is multiplied by a conversion coefficient "2.54" and a resulting product "50.8" is displayed on the main-display 14 through the main decoder driver 15. In response to the key signal KS, the arithmetic circuit 12 supplies an execution signal SS to the sub-displays 16A-16C through the sub-decoder driver 17. In response to the execution signal SS, the sub-displays 16A-16C maintain only the display for the unit conversion for which the conversion operation was carried out and erase the displays of other unit conversions FIG. 5 shows the status of the displays 16A-16C under this condition. The converted numerals "50.8" are displayed on the main-display 14 and only the unit conversion indication "in→cm" for which the convversion operation was carried out is displayed on the sub-display 16A above the key [7].

After the execution of the conversion operation, the arithmetic circuit 12 is reset to the normal operation mode. The sub-display 16A on which only the unit conversion "in→cm" is displayed returns to the state shown in FIG. 3 when the key signal KS produced by the next key operation is applied to the arithmetic circuit 12.

Figure 6:
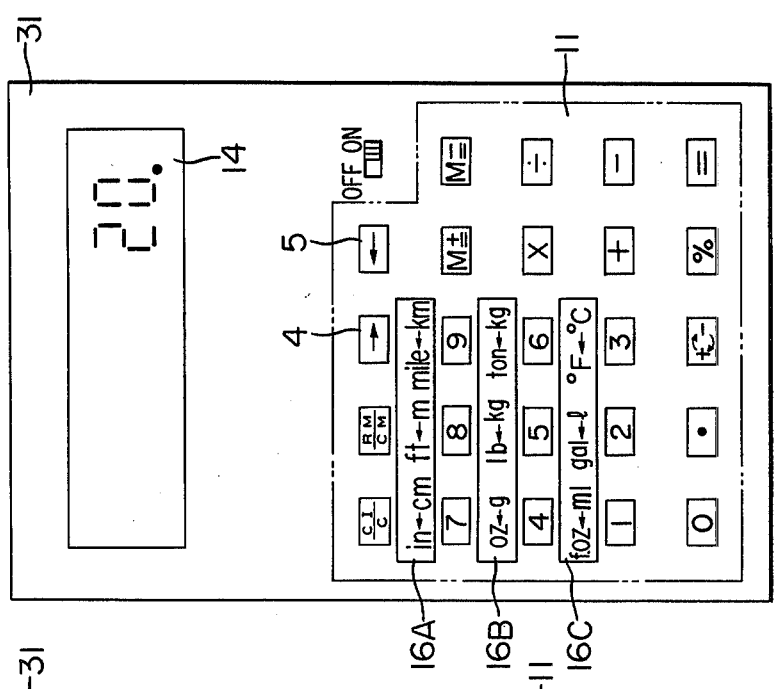
Figure 7:
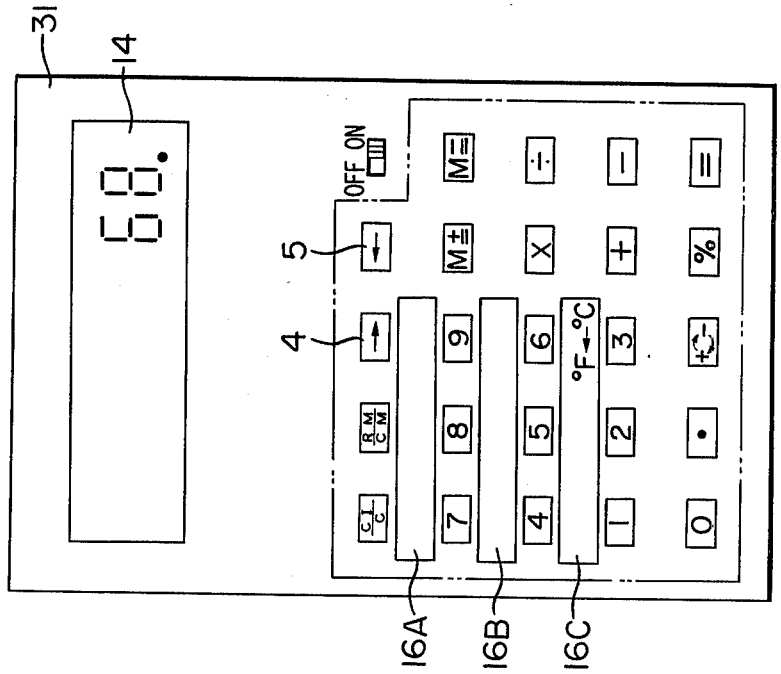

FIGS. 6 and 7 show another example of operation of the desk-top calculator in accordance with one embodiment of the electronic equipment of the present invention. Numerals "20" are displayed on the main-display 14. FIG. 6 shows a status when the unit conversion designation key 5 has been depressed. Since the unit conversion designation key 5 designates the unit conversion from the righthand unit to the lefthand unit, the arrow for the unit conversion displayed on the sub-displays 16A-16C is directed to the left. FIG. 7 shows the status when the key [3] has been depressed to carry out the conversion operation from Centigrade units to Fahrenheit units (°F.←°C.). That is, the numerals "20" on the main-display 14 is multiplied by 1.8 and "32" is added to the resulting product, and the resulting sum "68" is displayed on the main-display 14. Only the conversion unit "°F.←°C." continues to be displayed on the sub-display 16C above the key [3] to indicate that the numerals "68" have been obtained by the unit conversion operation from Centigrade to Fahrenheit.

Figure 8:
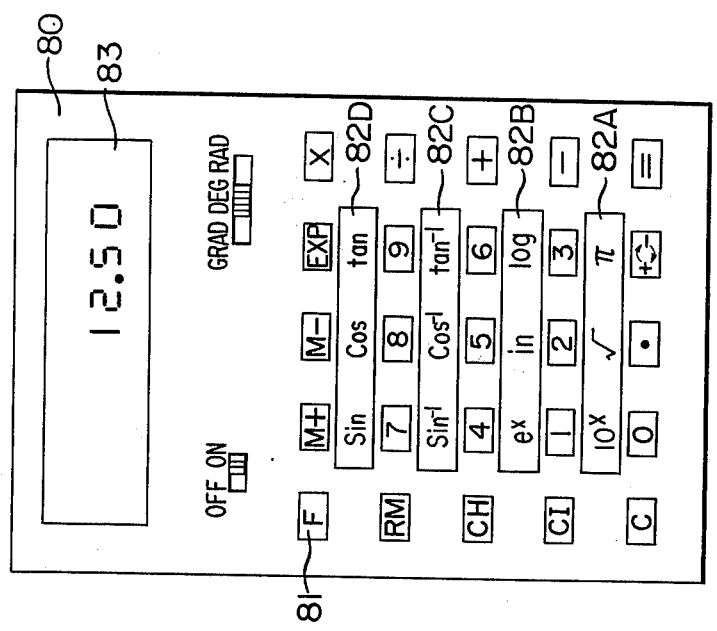
FIG. 8 shows a plan view of an electronic desk-top calculator in accordance with one embodiment of the electronic equipment of the present invention applied to a calculator capable of function operation.

FIG. 8 shows a desk-top function calculator in accordance with another embodiment of the electronic equipment of the present invention. It may be constructed in the same manner as the unit conversion desk-top calculator described above. FIG. 8 shows the status after a function key 81 has been depressed to set the second function mode and functions such as "sin" and "cos" assigned to the keys are displayed on sub-displays 82A-82D. When the key [7], for example, is depressed, the operation of "sin 12.50°" is carried out and the result is displayed on a main-display 83 and only the indication "sin" is displayed on the sub-display 82D. Thus, it is surely seen that the numerals displayed on the main-display 83 relate to the trigonometric function "sin".

As described hereinabove, according to the present invention, the keyboard of the electronic equipment such as desk-top calculator is provided with the sub-displays for displaying the operation functions in a second function mode and then displaying only selected one of the operation functions displayed on the sub-displays which was actually carried out. Accordingly, the operator can determine, by the observation of the sub-displays, the operation which resulted in the numerals displayed on the display. Accordingly, when the operator incorrectly operates the keys and improper operation is carried out by the desk-top calculator, the improper operation in the keying can be rapidly detected by watching the sub-displays. When the operator interrupts the operation, the operator can identify the operation step for the numerals displayed on the display by checking the display content on the sub-displays.

What I claim is:

1. An electronic equipment comprising:
    keyboard means including a plurality of keys each operable to enter at least one assigned function into said equipment;
    function display means for displaying the function assigned to each of said keys and arranged so that each said displayed function corresponds to the one of said plurality of keys on said keyboard means to which the function is assigned; and control means connected to said plurality of keys and to said function display means for erasing display of all functions of all of said keys except for the display of the function of a desired one of said keys which is operated.

2. An electronic equipment according to claim 1 wherein each of said plurality of keys is operable to enter a plurality of assigned functions into said apparatus and wherein said apparatus further comprises:

instruction means for selecting one of the assigned functions which each of said keys is operable to enter into said equipment.

3. An electronic equipment according to claim 2 wherein said instruction means includes a plurality of keys arranged on said keyboard means.

4. An electronic equipment comprising:

keyboard means including a plurality of keys, each operable to enter a first function and a second function, different from said first function, into said equipment;

instruction means for selecting one of said first function and said second function which each of said keys is operable to enter into said equipment by converting the selected function assigned to each of said keys from the first function to the second function in a first function conversion direction and from the second function to the first function in a second function conversion direction;

function display means connected to said instruction means for displaying the one of said first and said second function conversion directions selected by said instruction means for each of said keys in association with each of said keys; and control means connected to said function display means and to said plurality of keys for enabling said function display means to only display the one of said first and said second function conversion directions selected by said instruction means and associated with a desired one of said keys which is operated.

5. An electronic equipment comprising:

a keyboard including a plurality of function keys each operable to enter at least two assigned functions into said equipment;

instruction means for selecting one of the assigned functions which each of said keys is operable to enter into said equipment;

function display means connected to said instruction means for displaying the one of the functions which each of said keys is operable to enter into said equipment in accordance with the selection by said instruction means; and control means connected to said function display means and to said plurality of keys for causing said function display means to display the one function selected by operation of a desired one of said keys in accordance with the selection by said instruction means and for erasing from said function display means the display of the functions of all other of said keys selected in accordance with the selection by said instruction means.

6. An electronic equipment according to claim 5 further comprising:

processing means for processing data in accordance with the functions of said keys selected by said instruction means, the function in accordance with which processing is conducted being selected by operation of the desired one of said keys; and display means for displaying a result produced by processing the data with said processing means.

7. An electronic equipment according to claim 5 or 6 wherein said instruction means includes a plurality of direction keys each for instructing a desired one of a plurality of directions for performing the functions assigned to each of said functions keys, and said function display means displays all functions assigned to said function keys which are performed in the direction instructed by operation of one of said direction keys.

8. An electronic equipment according to claim 7 wherein said control means is further operable to detect operation of any one of said direction keys and is operable to control said function display means to display all functions of said function keys performed in the direction selected by operation of said one of said direction keys, said control means further being operable to control said function display means to display only the function of said desired one of said function keys which is operated.

9. An electronic equipment according to claim 5 wherein said function display means include individual function display means for each of said function keys.

* * * * *